Sept. 14, 1926.

A. D. CARDINET

INSECT TRAP

Filed May 4, 1925

1,599,408

ALBERT D. CARDINET
INVENTOR.

PER

Albert J. Fihe

ATTORNEY.

Patented Sept. 14, 1926.

1,599,408

UNITED STATES PATENT OFFICE.

ALBERT D. CARDINET, OF LOS ANGELES, CALIFORNIA.

INSECT TRAP.

Application filed May 4, 1925. Serial No. 27,649.

This invention relates to improvements in insect traps, particularly a combined poison container and trap especially adapted for ants or similar insects, and has for its principal object the provision of a simple, economical, and efficient means of trapping and otherwise disposing of insect pests.

One of the important objects of this invention is the provision in an insect trap or the like of a container adapted to be stationed in a vertical position upon the ground, floor, or in any other desired or suitable place, which shall be provided with a cover means, rendering its poison contents practically inaccessible to animals or the like who would otherwise be liable to injury therefrom, while at the same time allowing a ready access of the insects thereto.

Another important object of this invention is the provision in an ant trap or the like of a container for poison or other exterminator, which, while being readily accessible to the ants, is of such a construction that even though the space upon which the trap may be set becomes flooded, access of water to the interior thereof will be effectively prevented and any undesired spreading or dilution of the contents be avoided.

Still another and further important object of the invention is the provision, in an ant trap or the like, of a suitable container provided with a readily removable top whereby the same may be cleaned and refilled at intervals in a convenient and effective manner, the top being of a one-piece construction so as to practically eliminate any possibility of its getting out of order.

Other and further important objects of the invention will be apparent from the disclosures in the accompanying drawings and following specification.

The invention, in a preferred form, is illustrated in the drawings and hereinafter more fully described.

Figure 1:
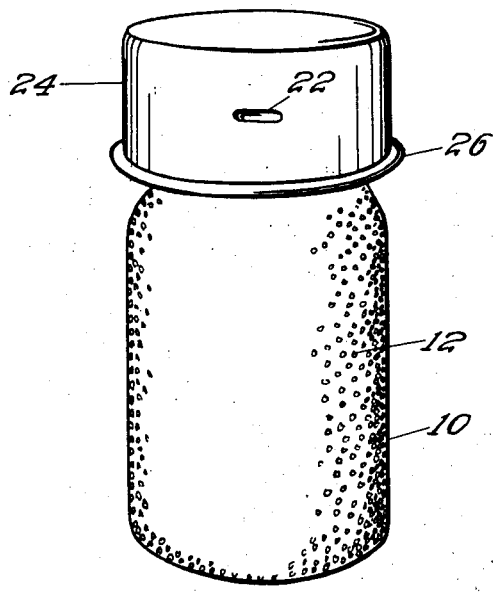
Figure 1 is a perspective elevation of the improved insect trap of this invention.

The reference numeral 10 indicates generally a container constituting the main portion of the improved trap of this invention, which container preferably is in the form of a glass jar, as indicated, so that the contents thereof may be readily inspected. The outer surface of the jar is preferably provided with a series of integral projections 12 forming a roughened exterior, whereby ants or other insects will be enabled to more easily crawl up the sides thereof and find access to the interior of the jar.

Figure 2:
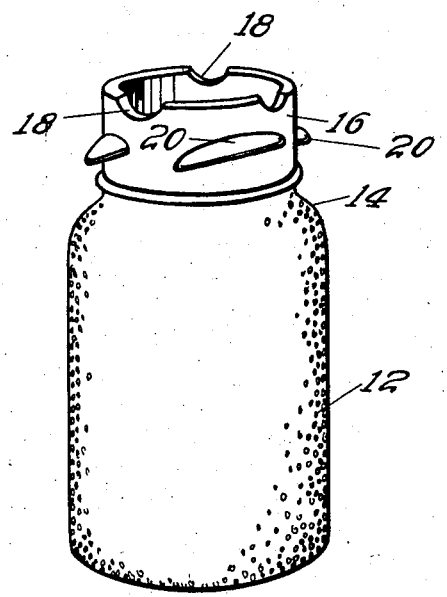
Figure 2 is a similar view showing the cover removed therefrom.

As best shown in Figure 2, the upper edge of the jar 10 is slightly constricted so as to provide a shoulder 14, the sloping interior face thereof proving an effective means of preventing ants or other insects from escaping from the jar after having once obtained access to the interior.

The upper constricted end of the jar 10, as shown at 16, has a plurality of depressions or notches 18 in its edge, so that when the cover is applied thereto spaces will be provided for the entrance of insects therethrough.

Figure 3:
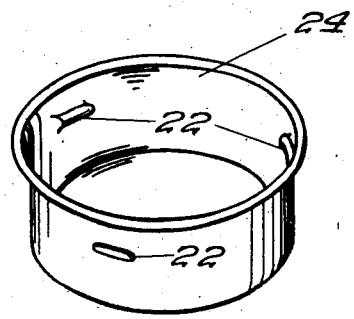
Figure 3 is a perspective view of the cover, illustrating particularly the interior arrangement thereof.

Formed integral with the upper end of the jar 16 is a plurality of outwardly extending lugs or projections 20 having their lower surfaces approximately flat and slightly inclined to the horizontal, these lugs 20 being designed for proper co-operation with corresponding inwardly struck extensions 22 integral with an oversize cover member 24, which is preferably of metal or some other suitable material, the shape and location of the projections 22 being best illustrated in Figure 3.

The cap 24 being considerably oversize as related to the upper end 16 of the jar 10, and the outwardly extending lugs or projections 20 being of such dimensions as to contact with the inner face of the cap 24 when the cap is placed on the jar; while at the same time allowing for the proper co-operation of the inwardly struck lugs 22 therewith, it will be obvious that in this manner a considerable space is provided between the inner face of the cap 24 and the outer face 16 of the upper end of the jar 10, and insects or the like, by crawling under the lower lip 26 of the cap 24, can accordingly gain ready access to the interior of the jar through the openings 18. The jar preferably contains a suitable poison whereby the ants or other insects are effectively exterminated.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. An insect trap, including in combination, a container, an oversize cover for the container, and co-operating means on the container and cover for maintaining said cover in position, said co-operating means including integral outstanding lugs on the upper end of the container and integral inwardly struck extensions in said cover.

2. An insect trap, including in combination, a container, an oversize cover for the container, and co-operating means on the container and cover for maintaining said cover in position, said co-operating means including integral outstanding lugs on the upper end of the container and integral inwardly struck extensions in said cover, said outstanding lugs provided with lower faces slightly inclined from the horizontal and with their outer edges extending sufficiently from the side of the container to afford proper locking and positioning contact with said oversize cover.

3. An insect trap, including in combination, a container, an oversize cover for the container, and co-operating means on the container and cover for maintaining said cover in position, said co-operating means including integral outstanding lugs on the upper end of the container and integral inwardly struck extensions in said cover, said outstanding lugs provided with lower faces slightly inclined from the horizontal and with their outer edges extending sufficiently from the side of the container to afford proper locking and positioning contact with said oversize cover while at the same time maintaining spaced relation between the inner face of the cover and the outer face of the upper end of the container.

In testimony whereof I affix my signature.

ALBERT D. CARDINET.